(12) United States Patent
Wada et al.

(10) Patent No.: US 6,512,643 B1
(45) Date of Patent: Jan. 28, 2003

(54) PHOTOSELECTIVE ABSORBING FILTER AND COLOR DISPLAY EQUIPPED WITH SAID FILTER

(75) Inventors: Atsushi Wada, Himeji (JP); Yoshinori Kawasaki, Himeji (JP)

(73) Assignee: Sanyo Color Works, Ltd., Hyogo (JP)

( * ) Notice: Subject to any disclaimer, the term of this patent is extended or adjusted under 35 U.S.C. 154(b) by 7 days.

(21) Appl. No.: 09/716,070

(22) Filed: Nov. 17, 2000

(30) Foreign Application Priority Data

Nov. 19, 1999 (JP) .......................................... 11-329626
Oct. 16, 2000 (JP) ....................................... 2000-315184

(51) Int. Cl.$^7$ ............................................... G02B 5/22
(52) U.S. Cl. ..................... 359/885; 252/582; 252/587; 430/517
(58) Field of Search .................... 359/885; 252/582, 252/589; 349/96; 430/517; 348/816

(56) References Cited

U.S. PATENT DOCUMENTS 4,245,242 A * 1/1981 Trcka .......................... 348/816
6,157,504 A * 12/2000 Yamada ...................... 359/885
6,280,838 B1 * 8/2001 Bernards .................... 428/325

FOREIGN PATENT DOCUMENTS

| JP | 9-211858 | 8/1997 |
| JP | 10-0644454 | 3/1998 |
| JP | 2000-285832 | 10/2000 |

* cited by examiner

*Primary Examiner*—Cassandra Spyrou
*Assistant Examiner*—Leo Boutsikaris
(74) *Attorney, Agent, or Firm*—Marshall, Gerstein & Borun

(57) ABSTRACT

A photoselective absorbing filter that avoids a decrease in luminance of picture elements and is capable of absorbing reflected light with high efficiency, and a color display device equipped with the photoselective absorbing filter, are disclosed. In a filter of the present invention, the transmittance of light at a wavelength ranging from 470 to 510 nm and at a wavelength ranging from 550 to 600 nm is a value smaller than a transmittance of light at a visible range other than said two wavelength ranges. The photoselective absorbing filter of the present invention contains a coloring material containing (a) a pyridinophthalocyanine selected from the group consisting of metal-tetra-2,3-pyridinoporphyrazine, metal-tetra-3,4-pyridinoporphyrazine, tetra-2,3-pyridinoporphyrazine and tetra-3,4-pyridinoporphyrazine, and (b) an anthraquinone dye. The anthraquinone dye is selected from Solvent Orange (35, 64, 65, 66, 68, 69, 71, 77, 86, and 87) and Solvent Red (52, 152, 155, 156, 168, 169, 170, 171, 172, 175, 177, 181, 190, and 191).

16 Claims, 3 Drawing Sheets

PHOTOSELECTIVE ABSORBING FILTER AND COLOR DISPLAY EQUIPPED WITH SAID FILTER

FIELD OF THE INVENTION

The present invention relates to a photoselective absorbing filter, and to a color display device equipped with said filter. More particularly, the present invention relates to a photoselective absorbing filter wherein reflected light is controlled by reducing light transmittance at a wavelength ranging from 470 to 510 nm and at a wavelength ranging from 550 to 600 nm, while inhibiting light absorption from the display device as little as possible, and to a color display device equipped with said filter.

PRIOR ART

Color display devices, such as CRT, PDP (plasma display panel), and liquid crystal display panels, usually are provided with an antireflection filter to improve contrast. A single layer filter is particularly preferable because of ease of handling. The antireflection filter is used to prevent external light, which is incident upon a display device from the outside of the display panel, from being reflected on a picture plane of the display device, and to solve a problem wherein the picture plane of the display device becomes invisible.

The antireflection filter ideally functions to inhibit a decrease in luminance of light from red, green, and blue picture elements to a minimum, and absorbs external light as much as possible. Filters using various color materials are known.

For example, a mixed coloring material prepared by mixing a blue pigment with a red pigment, and an anhydrous phosphoric acid cobalt pigment, recently have been suggested as the coloring material used in the antireflection filter.

However, a currently suggested filter formed by mixing a blue pigment with a red pigment has a disadvantage in that the transmittance is lowered at a green color wavelength ranging from 500 to 600 nm, thereby absorbing light emitted from the green picture element, which results in a decrease in luminance.

Also in an antireflection filter using an anhydrous phosphoric acid cobalt pigment, luminance is lowered due to poor transparency, and basic quality of the filter is presently insufficient.

The present invention solves the problems described above, and an object of the present invention is to provide a photoselective absorbing filter that does not cause a decrease in luminance of a picture element in a display device, and also is capable of absorbing external light with high efficiency, and to provide a color display device equipped with said filter.

SUMMARY OF THE INVENTION

A photoselective absorbing filter of the present invention comprises a light selective absorbing coloring material that selectively absorbs external light in a color display device with blue, green, and red picture elements, characterized in that a transmittance of light at a wavelength ranging from 470 to 510 nm and at a wavelength ranging from 550 to 600 nm is smaller than a transmittance of light in the visible range (380 to 780 nm) other than said two wavelength ranges.

Usually, blue, green, and red picture elements have an emission spectrum peak at about 450 nm, 540 nm and 630 nm, respectively. However, the photoselective absorbing filter of the present invention has absorption peaks at wavelength ranges different from these three emission peaks, that is, a wavelength ranging from 470 to 510 nm and a wavelength ranging from 550 to 600 nm, such that the luminance of the light-emitting picture elements is not reduced, and, moreover, reflected light is absorbed with high efficiency.

The photoselective absorbing filter of the present invention can be used in various color display devices, such as CRT, PDP, and liquid crystal display panels.

The photoselective absorbing coloring material of the present invention preferably contains (a) a pyridinophthalocyanine selected from the group consisting of a metal-tetra-2,3-pyridinoporphyrazine represented by the general formula (I), a metal-tetra-3,4-pyridinoporphyrazine represented by the general formula (II), a tetra-2,3-pyridinoporphyrazine represented by the general formula (III), and a tetra-3,4-pyridinoporphyrazine represented by the general formula (IV), and (b) an anthraquinone dye:

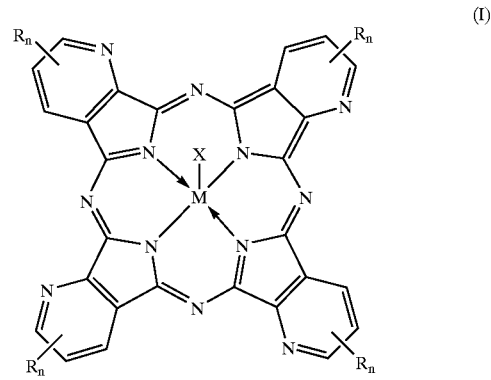

(I)

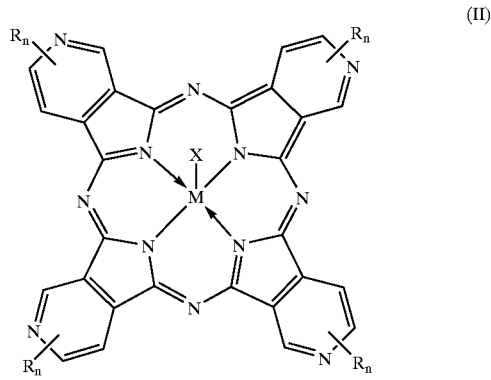

(II)

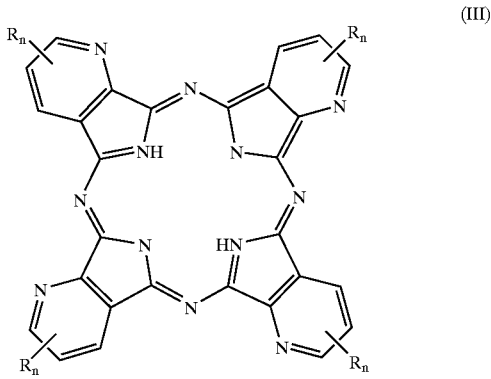

(III)

-continued

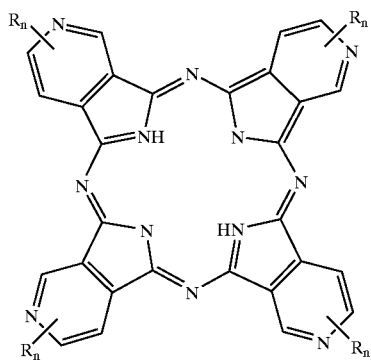

(IV)

wherein M represents a center metal selected from copper, cobalt, nickel, zinc, iron, tin, and aluminum; X represents a ligand bonded directly to the center metal M and is a halogen atom, such as fluorine, chlorine, or bromine, an oxygen atom, a nitrogen atom, a hydroxy group, or a siloxane group in Chemical Formulae (I) and (II). R represents an alkyl group or a halogen atom, and n represents an integer 0 to 3 in Chemical Formulae (I)–(IV).

M is not described as a "center metal ion," but is described as a "center ion" in the present specification because the metal tetrapyridinoporphyrazine described above did not dissociate into ions in the photoselective absorbing filter of the present invention, unlike the solution state.

Methods of preparing a pyridinophthalocyanine according to the present invention, for example, heating 2,3-dicyanopyridine, 3,4-dicyanopyridine, or a derivative thereof, together with a metal source, such as cupric chloride, and heating a metal source, such as quinolineamide, together with an ammonium salt of aminosulphonic acid, are known. However, it is more advantageous with respect to the manufacturing process and cost to use the Wyler method (e.g. "PHTHALOCYANINE COMPOUNDS," Moser et al., Reinhold Publ. Co., 1963, "SHINSENRYO KAGAKU (New Dye Chemistry)," written by Yutaka HOSODA, Gihodo, 1963), which is a standard method of preparing a copper-phthalocyanine known as a coloring material. General raw materials used in the preparation of a metal-phthalocyanine by the Wyler method are phthalic anhydride, urea, a metal source, such as copper chloride, and a catalyst (ammonia molybdate). A pyridinophthalocyanine can be satisfactorily prepared by replacing phthalic anhydride with quinolic acid, quinolic anhydride, cinchomeronic acid, or a derivative thereof, in accordance with a method of synthesizing copperphthalocyanine, and other conditions, such as reaction temperature, time, and the like, are the same as the above Wyler method.

It is necessary to monitor the amount of raw materials, such as quinolic acid, quinolic anhydride, cinchomeronic acid, or a derivative thereof, in the same manner as in a conventional reaction, because a pyridiniophthalocyanine pigment performs an objective function of the present invention. Because a pigmentation process also is required in the same manner as in case of other conventional pigments, it is also necessary to monitor the pigmentation.

Examples of an anthraquinone dye useful in the photosensitive absorbing filter of the present invention include Solvent Orange (35, 64, 65, 66, 68, 69, 71, 77, 86, and 87) and Solvent Red (52, 152, 155, 156, 168, 169, 170, 171, 172, 175, 177, 181, 190, and 191). The numerical value in the parentheses indicates a color index.

The coloring material used to make a photoselective absorbing filter of the present invention can be prepared by forming a dispersion of a pyridinophthalocyanine, and mixing the dispersion with a solution of a anthraquinone dye. The pyridinophthalocyanine dispersant can be prepared using conventionally known devices, such as ball mill, beads mill, roll mill, ultrasonic dispersing device, and the like.

The mixing ratio of pyridinophthalocyanine to the anthraquinone dye preferably is within a range from 80:20 to 20:80, in view of the shape of a spectral transmission spectrum. When the proportion of pyridinophthalocyanine exceeds 80%, an absorption at about 480 nm is poor, and an efficient absorption of external light is impossible to attain, which is not preferable. On the other hand, when the proportion of the anthraquinone dye exceeds 80%, an absorption at about 580 nm is poor, and an efficient absorption of external light is impossible to attain, which is not preferable.

DESCRIPTION OF THE PREFERRED EMBODIMENTS

The following Examples and Comparative Examples further illustrate the present invention in detail, but are not to be construed to limit the scope thereof. In the present specification, "parts" are by weightm unless otherwise stated.

Example 1

Zirconia beads (800) having a diameter of 0.5 mm were added to the following components, and then dispersed in a sand mill for one hour to prepare a pyridinophthalocyanine dispersion as composition 1.

| | |
|---|---|
| Copper-tetra-2,3-pyridinoporphyrazine | 20 parts by weight |
| BYK-110 (manufactured by BYK Chemie Co.) | 10 parts by weight |
| Toluene | 170 parts by weight |

Subsequently, the following components were stirred for one hour to prepare a dye solution as composition 2.

| | |
|---|---|
| Dia Resin Orange G (manufactured by Mitsubishi Chemical Industries Co., Ltd.) | 1.3 parts by weight |
| Toluene | 198.7 parts by weight |

Using the pyridinophthalocyanine solution as composition 1 and the dye solution as composition 2, the respective components were mixed in accordance with the following formulation, and then stirred for one hour to obtain a mixed solution. Although a polyvinyl chloride resin was used as a binder, an acrylic resin can be used as a substitute.

| | |
|---|---|
| Dispersion composition 1 | 1 part by weight |
| Dye solution composition 2 | 90 parts by weight |
| polyvinyl chloride resin (VYHH, manufactured by Union Carbide Co.) | 12 parts by weight |
| Toluene | 60 parts by weight |

The above mixture was stirred for one hour to give a coating solution. A glass plate was spincoated with the resulting coating solution at a film thickness of 0.6 to 0.7 micron to obtain a photoselective absorbing filter of the this Example.

Figure 1:
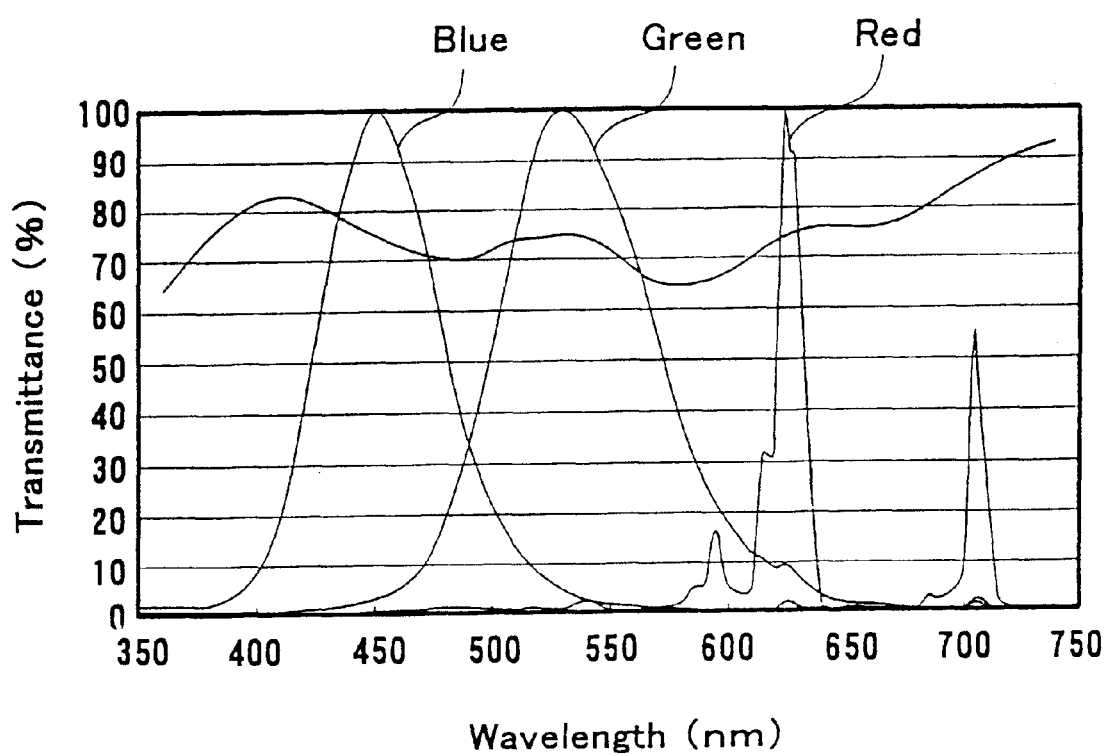
FIG. 1 is a graph of transmittance (%) vs. wavelength (nm) showing a spectral transmission spectrum of a photoselective absorbing filter according to one example of the present invention.

FIG. 1 is a graph showing a spectroscopic transmission spectrum of the photoselective absorbing filter according to Example 1. In FIG. 1, emission spectrums of red, green, and blue colors of the color display device also are shown. The emission spectrums of red, green, and blue colors of the color display device have a dominant emission peak at a wavelength of about 625 nm 535 nm and 450 nm, respectively. To the contrary, the spectroscopic transmission spectrum of the coloring material of the present invention has an absorption peak (i.e., low transmittance range) at a wavelength of about 580 nm, which exists between the two dominant emission peaks of red and green, and at a wavelength of about 480 nm, which exists between two dominant emission peaks of blue and green.

Comparative Example 1

Figure 2:
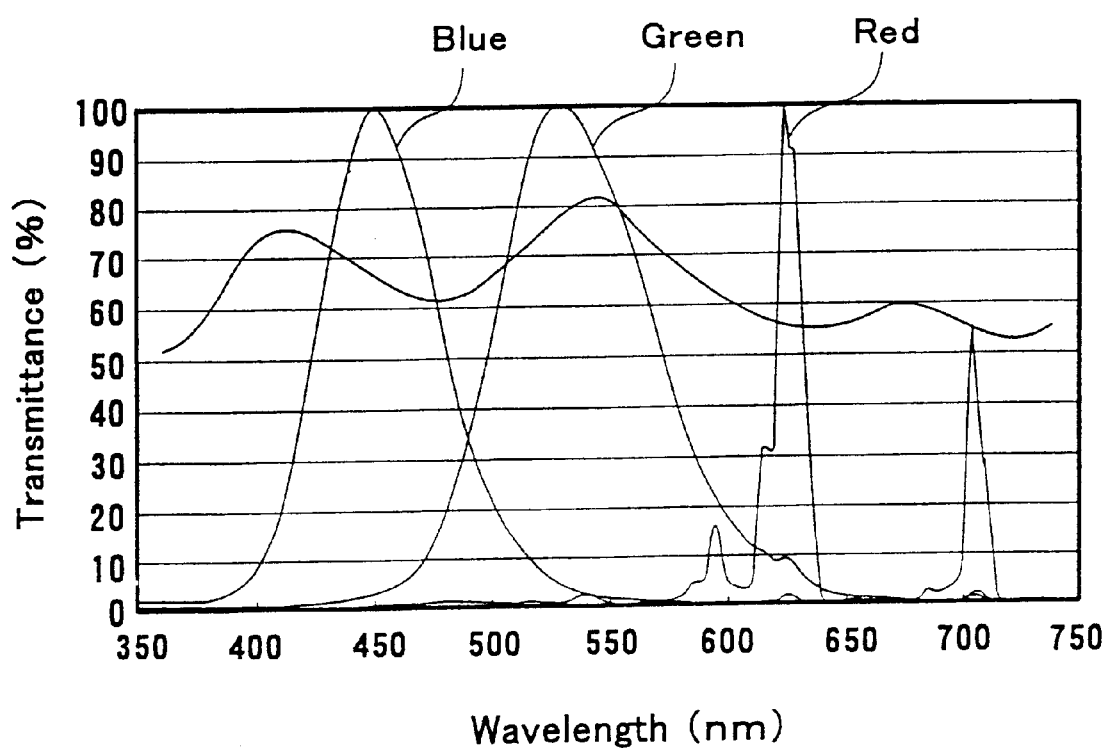
FIG. 2 is a graph of transmittance (%) vs. wavelength (nm) showing a spectral transmission spectrum of the photoselective absorbing filter according to Comparative Example 1 of the present invention.

In the same manner as Example 1, except that Cyanine Blue KRO (C.I. Pigment Blue 15:3, manufactured by Sanyo Color Works Ltd.) was substituted for pyridinophthalocyanine in Example 1, a glass plate was coated to obtain a photoselective absorbing filter of Comparative Example 1. FIG. 2 is a graph showing a spectroscopic transmission spectrum of this photoselective absorbing filter. In FIG. 2, emission spectrums of red, green, and blue colors of the color display device also are shown for comparison. As is apparent from the shape of the spectrum in FIG. 2, an absorption at a long wavelength side appeared at about 620 nm in the photosensitive absorbing filter of Comparative Example 1, such that the emission peak of a red color of the color display device is drastically absorbed, thereby causing a decrease in luminance.

Comparative Example 2

Figure 3:
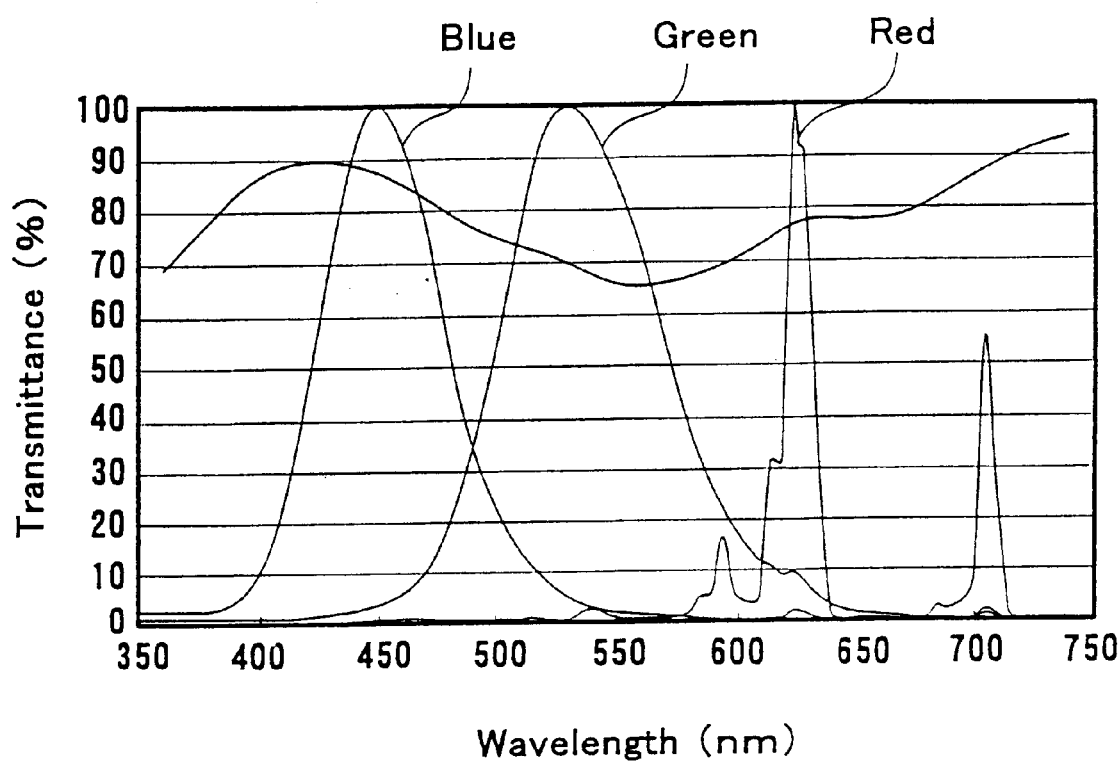
FIG. 3 is a graph of transmittance (%) vs. wavelength (nm) showing a spectral transmission spectrum of the photoselective absorbing filter according to Comparative Example 2 of the present invention.

In the same manner as in Example 1, except that C.I. Solvent Red 111 was substituted for C.I. Solvent Orange 68 as the anthraquinone dye in Example 1, a glass plate was coated to obtain a photoselective absorbing filter of Comparative Example 2. FIG. 3 is a graph showing a spectral transmission spectrum of this photoselective absorbing filter. In FIG. 3, emission spectrums of red, green, and blue colors of the color display device also are shown for comparison. As is apparent from the shape of the spectrum in FIG. 3, the emission peak of a green color of the color display device is absorbed, thereby causing a decrease in luminance in the photoselective absorbing filter of Comparative Example 2.

The photoselective absorbing filters of Example 1 and Comparative Examples 1 and 2 then were used in a color CRT display device. In the display device using the photoselective absorbing filter of Example 1, luminance of the red, green, and blue picture elements was high, and the amount of reflected light was small. To the contrary, in the display device using the photoselective absorbing filters of Comparative Examples 1 and 2, luminance of red and green picture elements was low, and the amount of reflected light was not greater than the CRT device containing Example 1.

As described above, a photosensitive absorbing filter of the present invention efficiently absorbs external light without a decrease in luminance attributed to absorption of red, green, and blue lights of a color display device. These advantageous features are attributed a light transmittance at a wavelength ranging from 470 to 510 nm and at a wavelength ranging from 550 to 600 nm that is lower than a transmittance of light in a visible range other than said two wavelength ranges.

When using a present color display device with the photosensitive absorbing filter, users of the color display device of the present invention are provided with a picture plane a reduced decrease in luminance due to absorption of red, green, and blue lights and less reflected light.

What is claimed is:

1. A photoselective absorbing filter comprising a light selective absorbing coloring material that selectively absorbs external light in a color display device having blue, green, and red picture elements, wherein a transmittance of light at a wavelength ranging from 470 to 510 nm and at a wavelength ranging from 550 to 600 nm is smaller than a transmittance of light in a visible range other than said two wavelength ranges, wherein said light selective absorbing coloring material comprises (a) a pyridinophthalocyanine selected from the group consisting of a metal-tetra-2,3-pyridinoporphyrazine of general formula (I), a metal-tetra-3,4-pyridinoporphyrazine of general formula (II), a tetra-2,3-pyridinoporphyrazine of general formula (III), a tetra-3,4-pyridinoporphyrazine of general formula (IV), and mixtures thereof,

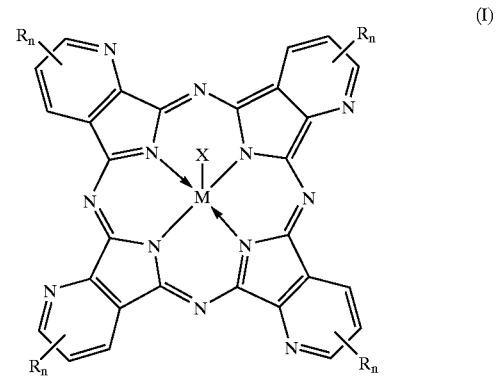

(I)

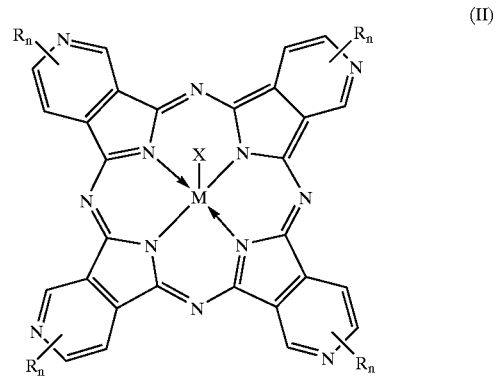

(II)

-continued

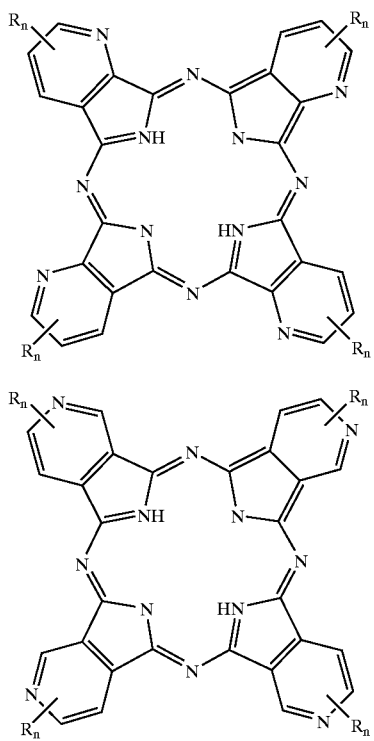

wherein M is a center metal selected from the group consisting of copper, cobalt, nickel, zinc, iron, tin, and aluminum; X is a ligand bonded directly to the center metal M and is a halogen atom selected from fluorine, chlorine, and bromine, an oxygen atom, a nitrogen atom, a hydroxy group, or a siloxane group; R is an alkyl group or a halogen atom; and n is an integer of 0 to 3; and (b) an anthraquinone dye.

2. The photoselective absorbing filter of claim 1 wherein said anthraquinone dye is selected from Solvent Orange (35, 64, 65, 66, 68, 69, 71, 77, 86, and 87) and Solvent Red (52, 152, 155, 156, 168, 169, 170, 171, 172, 175, 177, 181, 190, and 191).

3. The photoselective absorbing filter of claim 1 wherein a weight ratio of the pyridinophthalocyanine to the antraquinone dye is 20:80 to 80:20.

4. The photoselective absorbing filter of claim 2 wherein a weight ratio of the pyridinophthalocyanine to the anthraquinone dye is 20:80 to 80:20.

5. The photoselective absorbing filter of claim 1 prepared by coating a surface of a film with the light selective absorbing coloring material.

6. The photoselective absorbing filter of claim 2 prepared by coating the surface of a film with the light selective absorbing coloring material.

7. The photoselective absorbing filter of claim 3 prepared by coating the surface of a film with the light selective absorbing coloring material.

8. The photoselective absorbing filter of claim 1, wherein the light selective absorbing coloring material is uniformly dispersed in a film.

9. The photoselective absorbing filter of claim 2, wherein the light selective absorbing coloring material is uniformly dispersed in a film.

10. The photoselective absorbing filter of claim 3, wherein the light selective absorbing coloring material is uniformly dispersed in a film.

11. The photoselective absorbing filter of claim 1, wherein the light selective absorbing coloring material is dispersed in a solvent comprising an alcohol, ant a glass is coated with the dispersion using a sol-gel method.

12. The photoselective absorbing filter of claim 2, wherein the light selective absorbing coloring material is dispersed in a solvent comprising an alcohol, and a glass is coated with the dispersion using a sol-gel method.

13. The photoselective absorbing filter of claim 3, wherein the light selective absorbing coloring material is dispersed in a solvent comprising an alcohol, and a glass is coated with the dispersion using a sol-gel method.

14. A color display device comprising the photoselective absorbing filter of claim 1.

15. A color display device comprising the photoselective absorbing filter of claim 2.

16. A color display device comprising the photoselective absorbing filter of claim 3.

* * * * *

UNITED STATES PATENT AND TRADEMARK OFFICE
CERTIFICATE OF CORRECTION

PATENT NO.    : 6,512,643 B1
DATED         : January 28, 2003
INVENTOR(S)   : Wada et al.

It is certified that error appears in the above-identified patent and that said Letters Patent is hereby corrected as shown below:

Column 8,
Line 27, ", ant a" should be -- , and a --

Signed and Sealed this

Twelfth Day of August, 2003

JAMES E. ROGAN
*Director of the United States Patent and Trademark Office*